(12) United States Patent
Fuchigami

(10) Patent No.: US 6,750,863 B2
(45) Date of Patent: Jun. 15, 2004

(54) METHOD OF HIGH-SPEED ADJUSTMENT OF LUMINANCE BY LIGHT IN 3-D COMPUTER GRAPHICS

(75) Inventor: Kazuo Fuchigami, Saitama-ken (JP)

(73) Assignee: Kuusou Kagaku Corp., Saitama-ken (JP)

( * ) Notice: Subject to any disclaimer, the term of this patent is extended or adjusted under 35 U.S.C. 154(b) by 279 days.

(21) Appl. No.: 09/898,000

(22) Filed: Jul. 5, 2001

(65) Prior Publication Data

US 2002/0003538 A1 Jan. 10, 2002

(30) Foreign Application Priority Data

Jul. 6, 2000 (JP) ........................................ 2000-205766
Jul. 25, 2000 (JP) ........................................ 2000-223586

(51) Int. Cl.$^7$ ............................................... G06T 15/50
(52) U.S. Cl. ........................................ 345/426; 345/420
(58) Field of Search .................................. 345/420, 426

(56) References Cited

U.S. PATENT DOCUMENTS 5,828,378 A    10/1998  Shiraishi
6,529,194 B1 *  3/2003  Yamaguchi ................. 345/426

FOREIGN PATENT DOCUMENTS

EP         0 358 493 A2    3/1990

OTHER PUBLICATIONS

Andrew Woo et al; "A Survey Of Shadow Algorithms"; University of Toronto; IEEE Computer Graphics & Applications; Nov. 1990; pp. 13–32.

* cited by examiner

*Primary Examiner*—Mark Zimmerman
*Assistant Examiner*—Adam Arnold
(74) *Attorney, Agent, or Firm*—Sughrue Mion, PLLC

(57) ABSTRACT

A method for drawing shadows of a solid body, generated by light and illuminated regions of the solid body, formed by light, on a display device at high speed and with accuracy. The process of generating a shadow in 3-D computer graphics comprises the steps of forming a solid body as a shadow space of a polygon by causing respective vertices of the polygon to be shifted in the vector direction of the light rays to the boundary of the drawing space. Next the luminance within a scope of faces on the back side of the solid body as seen from the point of view at the time of drawing with respect to respective faces composing the solid body is increased by adding to the extent of a constant for luminance adjustment to the luminance within the scope of the faces on the back side of the solid body The luminance within a scope of faces on the front side of the solid body as seen from the point of view at the time of drawing is decreased by subtracting to the extent of the constant for luminance adjustment from the luminance thereof, wherein a change of luminance with respect to the polygon which is a shaded face is prohibited after processing of the shaded face.

10 Claims, 5 Drawing Sheets face ABQP: −K face PQR: −K face BQRC: +K face APRC: +K face ABC: +K face ABQP: +K face PQR: +K face BQRC: −K face APRC: −K face ABC: −K

METHOD OF HIGH-SPEED ADJUSTMENT OF LUMINANCE BY LIGHT IN 3-D COMPUTER GRAPHICS

BACKGROUND OF THE INVENTION

1. Field of the Invention

The present invention relates to a method of drawing luminance of shadows of an object, generated by light, or luminance of illuminated regions formed by ambient light incoming from windows, and so forth, at high-speed and with accuracy, in rendering 3-D computer graphics.

2. Description of the Related Art

Drawing of shadows, used in 3-D computer graphics, is executed by a process whereby, with respect to all polygons lying on the back side in relation to light rays capable of casting shadows thereon, a polygon is projected on a plane that includes polygons on which shadows can be cast, lying on the front side in relation to the light rays.

With the conventional method, drawing of shadows required vector operation in an amount proportional to the square of the number of polygons as the targets of drawing. Calculations required by the vector operation are only multiplication, division, addition, and subtraction except for the time of preparing determinants for initial transformations, and loads of such multiplication, division, addition, and subtraction, as imposed on a computer, are not great.

However, since a total amount of calculations generally becomes massive, it has been a general practice to draw only shadows thrown on a plane such as the ground in the case of drawing shadows of an object due to limited time allowed for the operation at the time of interactive representation when real-time drawing is required. Hence it has been impossible to implement not only accurately casting shadows on a solid body in a complex shape in real time but also casting shadows thereon even in a pseudo manner.

Further, light rays incoming through windows, and light rays incoming indoors through transparent bodies illuminate the floor, the wall, and solid bodies in a complex shape, thereby forming illuminated regions having luminance higher than that in the surroundings. The illuminated regions are in reverse relation to shadows having luminance lower than that in the surroundings, and for the same reason as in the case of the shadows described above, it is impossible to draw the illuminated regions by means of a simple operation. It is therefore an object of the invention to draw the scope of shadows of a solid body by light and the illuminated regions of the solid body, formed by light, on a display device at high speed and with accuracy by means of a less and simple operation.

SUMMARY OF THE INVENTION

To this end, with a method according to the invention, in a process of generating a shadow Ls in 3-D computer graphics, a solid body (ABCD) is first drawn in a drawing space as a target for drawing in accordance with the Z-buffer method or a method similar thereto, and subsequently, in the course of executing the process of generating the shadow Ls with respect to a polygon (ABC) facing away from light rays L among all polygons (ABC, ACD, ADB) composing the solid body (ABCD) existing in the drawing space, the following novel steps are taken.

With the method of adjusting luminance by light at high speed in rendering 3-D computer graphics according to the invention, said process comprises the steps of:

forming a solid body (ABCPQR) as a shadow space of the polygon (ABC) by causing respective vertices (A, B, C) of the polygon (ABC) to be shifted in the vector direction of the light rays (L) to the boundary of the drawing space; and increasing luminance within a scope of faces on the back side of the solid body (ABCPQR) as seen from the point of view (E) at the time of drawing with respect to respective faces composing the solid body (ABCPQR) by adding to the extent of a constant (K) for luminance adjustment to the luminance within the scope of the faces on the back side of the solid body (ABCPQR) while decreasing luminance within a scope of faces on the front side of the solid body (ABCPQR) as seen from the point of view (E) at the time of drawing by subtracting to the extent of the constant (K) for luminance adjustment from the luminance within the scope of the faces on the front side thereof.

As a result of the process described above, when a polygon (α) does not exist in the shadow space of the solid body (ABCPQR), luminance of respective faces of the solid body (ABCPQR) is rendered to be in a state undergoing no change because of (K−K=0).

Meanwhile, when the polygon (α) exists in the shadow space of the solid body (ABCPQR), a drawing process by hidden surface removal is not applied to the respective faces of the solid body (ABCPQR), more backward than the polygon (α) as seen from the point of view (E) at the time of drawing, thereby not rendering luminance in a region of hidden surface removal brighter by the constant value (K.). Accordingly, there will be executed a process of rendering luminance within the scope of a face of the solid body ABCPQR, lying in a forward position of the polygon (α) as seen from the point of view (E), that is, the front face thereof as seen from the point of view (E), subtracted consequentially by the constant value (K), so that there will be created a state equivalent to that where the shadow (Ls) of the polygon (ABC) is projected on the polygon (α) from the viewpoint of representation.

Thus, it follows that the shadow (Ls) of the polygon (ABC) can be drawn on the polygon (α) in the solid body (ABCPQR) as the shadow space at high speed and with accuracy by simple calculation for luminance adjustment.

Further, when a plurality of polygons α exist in the solid body ABCPQR as the shadow space, luminance adjustment is executed in the order of the back side to the front side as seen from the point of view (E) and a range of luminance adjustment is limited to one stage, so that if the range of the luminance adjustment exceeds the stage, a subtrahend value of luminance is limited to the constant value (K) only. As a result, luminance within the scope of the shadow (Ls) is not decreased more than necessary.

In the case where the point of view (E) lies within the solid body (ABCPQR) as the shadow space, and the front face thereof in relation to the point of view (E) does not exist, processing is executed exceptionally as a case of the front face being in a state covering the field of vision. As a result, it becomes possible to execute the same shadow generation process as described above even in such a special condition as described above.

In the case where the shadow (Ls) is cast on both polygons (α), adjacent to each other, respectively, within the solid body (ABCPQR) as the shadow space, processing of the shadow (Ls) of a side shared by both the polygons (α) is omitted, thereby shortening an operation time.

When a polygon ABC which is a shaded face interferes with a solid body EFGSTU as a shadow space of the other polygon EFG, a decrease in luminance of the polygon ABC which is the shaded face, caused by the shadow generation process applied to the other polygon EFG, can be prevented by prohibiting a change of luminance with respect to the polygon ABC which is the shaded face after processing of the shaded face in a stage where drawing of the solid body (ABCD) is completed, thereby enabling a drawing state of the solid body (ABCD) to be preserved at an initial luminance value.

As previously described, light rays (L) incoming through windows, transparent bodies, and so forth illuminate the floor, the wall, the ceiling, and other solid bodies in a complex shape, thereby forming an illuminated region (Li) having luminance higher than that in the surroundings. The illuminated region (Li) is in a reverse relation to the shadows (Ls) having luminance lower than that in the surroundings.

Assuming that the polygon (ABC) is a window or a transparent body in the course of drawing the previously-described shadow (Ls), the solid body (ABCPQR) is regarded as an illuminated space of the incoming light rays (L). If luminance adjustment is applied to respective faces of the solid body (ABCPQR) as the illuminated space by designating the respective faces with the positive sign and the negative sign, respectively, contrary to those in the case of drawing the shadow (Ls), it is possible to draw the illuminated region (Li) having luminance higher than that in the surroundings on a polygon α at high speed and with accuracy by the light rays (L) incoming through the windows, and transparent bodies.

More specifically, in accordance with a second aspect of the invention, in a process of generating an illuminated region (Li) by light rays (L) in 3-D computer graphics, a solid body (ABCD) is first drawn in a drawing space as a target for drawing according to the Z-buffer method or a method similar thereto, and subsequently, in the course of executing the process of generating the illuminated region (Li) with respect to a polygon (ABC) allowing the light rays (L) to pass therethrough among all polygons composing the solid body existing in the drawing space, the following novel steps are taken.

With a method of adjusting luminance by light at high speed in rendering 3-D computer graphics according to the invention, said process comprises the steps of:

forming a solid body (ABCPQR) as an illuminated space, formed by the polygon (ABC), by shifting respective vertices (A, B, C) of the polygon (ABC) in the vector direction of the light rays (L) to the boundary of the drawing space; and decreasing luminance within a scope of faces on the back side of the solid body (ABCPQR) as seen from the point of view (E) at the time of drawing with respect to respective faces composing the solid body (ABCPQR) by subtraction to the extent of a constant (K) for luminance adjustment, while increasing luminance within a scope of faces on the front side of the solid body (ABCPQR) as seen from the point of view (E) at the time of drawing by addition to the extent of the constant (K) for luminance adjustment.

As a result of a luminance addition process or a luminance subtraction process, when a polygon (α) does not exist in the illuminated space of the solid body (ABCPQR), luminance of respective faces of the solid body (ABCPQR) is rendered to be in a state undergoing no change because of (K−K=0). Meanwhile, when the polygon (α) exists in the illuminated space of the solid body (ABCPQR), a drawing process by hidden surface removal is not applied to the respective faces of the solid body (ABCPQR), more backward than the polygon (α) as seen from the point of view (E) at the time of drawing, thereby not rendering luminance in a region of hidden surface removal to become darker by the constant value (K.), so that there is executed a process of rendering luminance within the scope of a face of the solid body ABCPQR, lying in a forward position of the polygon (α) as seen from the point of view (E), that is, the front face thereof as seen from the point of view (E), added by the constant value (K) in consequence, creating a state equivalent to that where the illuminated region (Li) formed by the polygon (ABC) is projected on the polygon (α) from the viewpoint of representation.

Thus, the illuminated region (Li) of the light rays (L) from the polygon (ABC) can be drawn on the polygon (α) in the solid body (ABCPQR) as the illuminated space at high speed and with accuracy by simple calculation for luminance adjustment.

When a plurality of polygons a exist in the solid body ABCPQR as the illuminated space, luminance adjustment is executed in the order of the front side to the back side as seen from the point of view (E) and a range of luminance adjustment is limited to one stage, and if the range of the luminance adjustment exceeds the stage, an addend value of luminance is limited to the constant value (K) only, thereby preventing luminance in the scope of the illuminated region (Li) from increasing higher than necessary.

In the case where the point of view (E) lies within the solid body (ABCPQR) as the illuminated space, and the front face thereof in relation to the point of view (E) does not exist, processing is executed exceptionally as a case of the front face being in a state covering the field of vision. As a result, it becomes possible to execute the same process for the illuminated region (Li) as described above even in such a special condition as described above.

In the case where the illuminated region (Li) occurs to both polygons (α), adjacent to each other, respectively, within the solid body (ABCPQR) as the illuminated space, processing of the illuminated region (Li) of a side shared by both the polygons (α) is omitted, thereby shortening an operation time.

When the polygon (ABC) interferes with a solid body (EFGSTU) as an illuminated space of the other polygon (EFG) allowing light rays (L) to pass therethrough, an increase in luminance of the polygon (ABC), caused by processing of the illuminated region (Li) of the other polygon EFG, is prevented by prohibiting change of luminance with respect to the polygon (ABC) after processing of luminance thereof in a stage where drawing of a solid body (ABCD) is completed, so that the drawing state of the solid body (ABCD) at the initial luminance value can be preserved.

DESCRIPTION OF THE PREFERRED EMBODIMENTS

Figure 1:
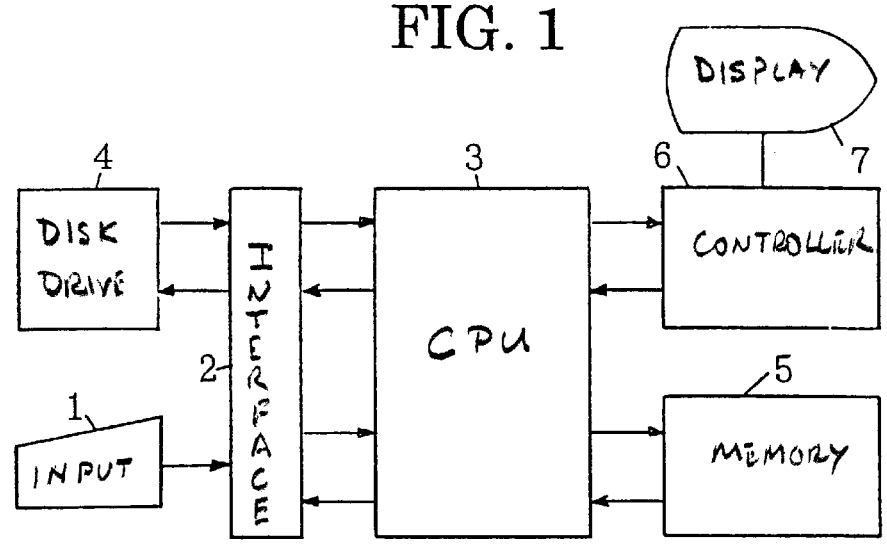
FIG. 1 is a block diagram of a system for carrying out an embodiment of a method of adjusting luminance by light at high speed in rendering 3-D computer graphics, according to the invention.

FIG. 1 shows a system for carrying out an embodiment of a method of adjusting luminance by light at high speed in rendering 3-D computer graphics, according to the invention. An input device 1 comprises a keyboard, an exclusive drawing tool, or the like, and is connected to a CPU 3 via an interface 2. Based on a command received from the input device 1, the CPU 3 reads from a disk drive 4 via the interface 2 not only a program for the method of adjusting luminance by light in rendering 3-D computer graphics, according to the invention, but also various other programs, and stores the same in a memory 5, or reads out programs prestored in the memory 5, thereby displaying solid graphics on a display 7 as a display unit via a display controller 6.

Figure 2:
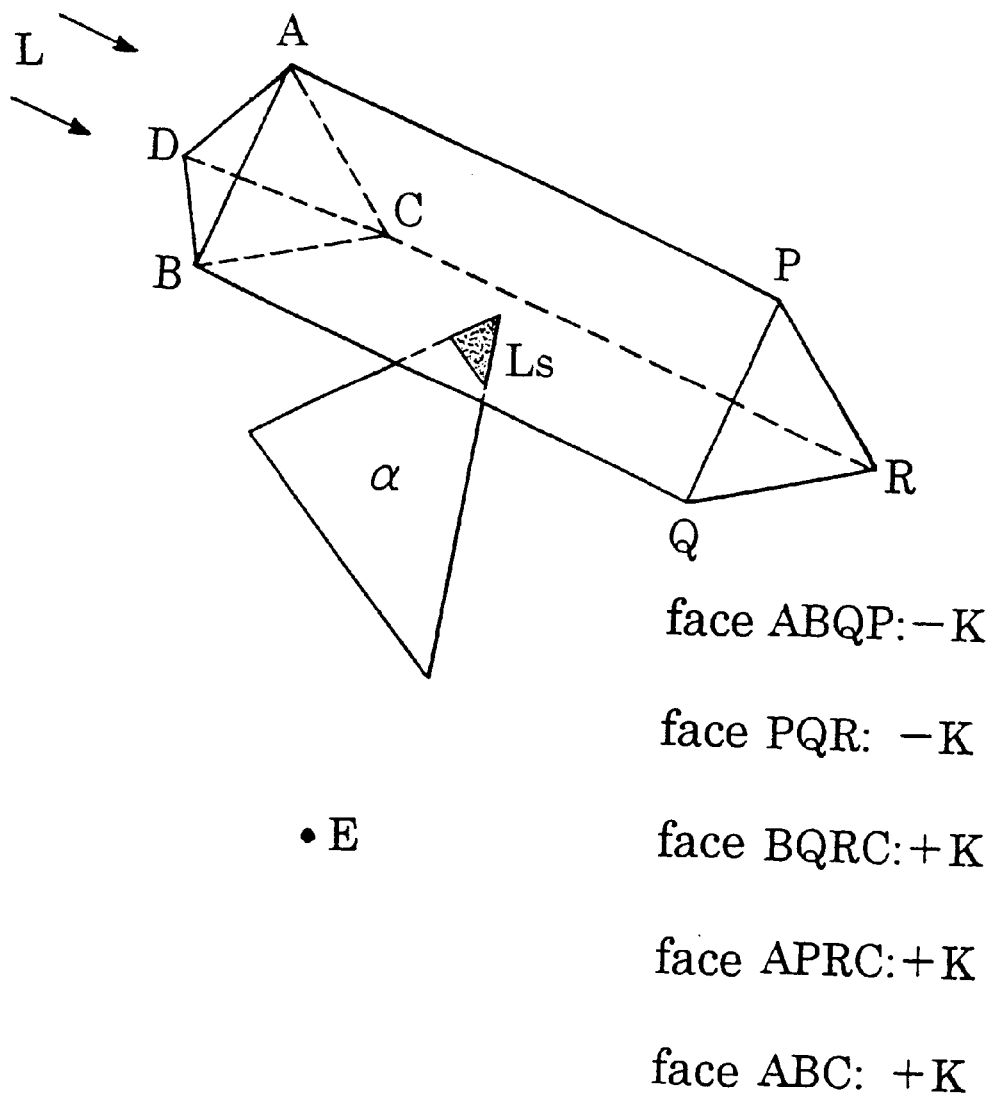
FIG. 2 is a schematic representation of a case of generating a shadow by an embodiment of the method of adjusting luminance by light at high speed in rendering 3-D computer graphics, according to the invention.

FIG. 2 shows by way example a case of generating a shadow Ls of a solid body ABCD in the shape of a simplest tetrahedron on a portion of a polygon a by collimated light rays L from an infinitely distant light source. Further, FIG. 3 shows a flow chart of a shadow generation process, based on the method of adjusting luminance by light at high speed in rendering 3-D computer graphics, according to the invention.

Figure 3:
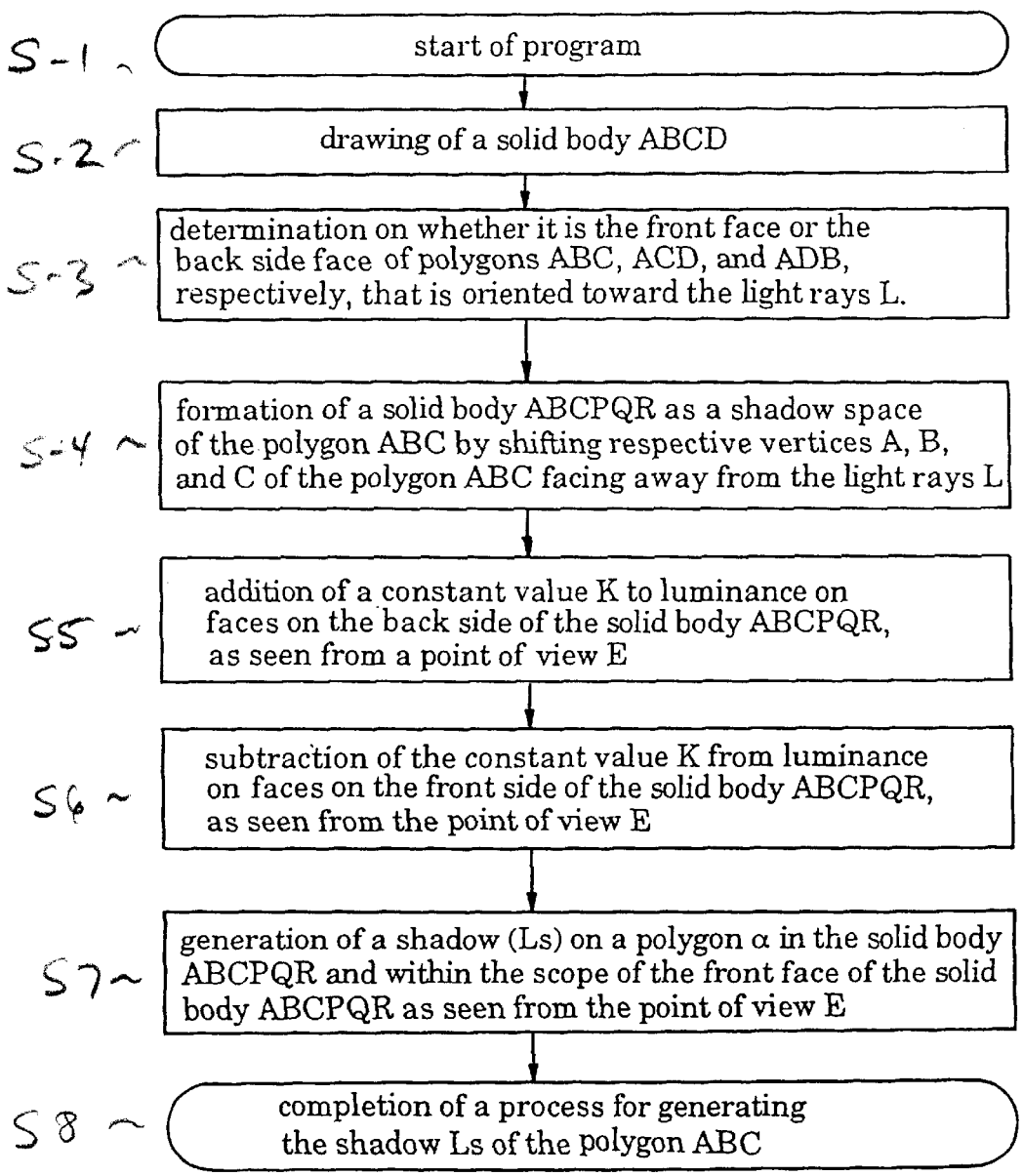
FIG. 3 is a flow chart of a shadow generation process, based on the embodiment of the method of adjusting luminance by light at high speed in rendering 3-D computer graphics, according to the invention.

First, an operator starts a program (step S-1) for the shadow generation process shown in FIG. 3, whereby after the solid body ABCD is drawn (step S-2) in a drawing space as a target for drawing in accordance with the Z-buffer method or a method similar thereto without executi+ng a process of generating the shadow Ls, a command for executing the process of generating the shadow Ls, based on the method of adjusting luminance by light at high speed in rendering 3-D computer graphics, according to the invention, is issued to the CPU 3. The contents of a Z-buffer prepared at the time of drawing are used for reference at the time of generating the shadow Ls.

The program for the shadow generation process (step S-3) determines whether it is the front face or the back side face of polygons ABC, ACD, and ADB, respectively, composing the solid body ABCD existing in the drawing space, that is oriented toward the light rays L. Such determination on whether it is the front face or the back side face is executed by finding the inner product of a normal vector of respective polygon faces and a direction vector of the light rays L with respect to all the polygons ABC, ACD, and ADB.

Assuming that a normal vector of respective faces of a solid body ABCPQR is oriented toward the outer side of the solid body ABCPQR, and that the backward direction with reference to a coordinate system centering around a point of view is regarded as the plus direction of the z-axis, it follows that, if the z component of a normal vector of a face of the solid body ABCPQR is plus, the face represents a back side face as seen from the point of view, and if the same is minus, the face represents a front face as seen from the point of view Accordingly, if the inner product of a normal vector of a polygon face and a direction vector of the light rays L is plus in value, the front face of the polygon face aimed at is oriented towards the light rays L. In the case of the example shown in FIG. 2, since the front face of the polygons ACD and ADB, respectively, is oriented towards the light rays L, there is no need of executing the process of generating the shadow Ls with respect to the polygons ACD and ADB. Accordingly, the program for the shadow generation process does not execute the process of generating the shadow Ls with respect to the polygons ACD and ADB, and proceeds to processing of a next polygon face.

If the inner product of a normal vector of a polygon face and the direction vector of the light rays L is minus in value, it follows that the back side face of the polygon face aimed at is oriented towards the light rays L. In the case of the example shown in FIG. 2, as the polygon ABC faces away from the light rays L, the process of generating the shadow Ls is required with respect to the polygon ABC. Accordingly, the program for the shadow generation process executes the process of generating the shadow Ls with respect to the polygon ABC facing away from the light rays L.

The program for the shadow generation process (step S-4) causes respective vertices A, B, and C of the polygon ABC to be shifted in the vector direction of the collimated light rays L to the boundary of the drawing space as the target for drawing, thereby forming a solid body ABCPQR in the shape of a trigonal prism as a shadow space of the polygon ABC. In the case of a point light source, the solid body ABCPQR as the shadow space takes the shape of a triangular pyramid.

Subsequently, in step S-5 the program for the shadow generation process executes a process whereby, with respect to respective faces composing the solid body ABCPQR as the shadow space, a constant value K for luminance adjustment is added to luminance within a scope of faces on the back side of the solid body ABCPQR as seen from the point of view E at the time of drawing, thereby increasing the luminance within the scope of the faces on the back side thereof, and subsequently in step S-6, the constant value K for luminance adjustment is subtracted from luminance within a scope of faces on the front side of the solid body ABCPQR as seen from the point of view E at the time of drawing, thereby decreasing the luminance within the scope of the faces on the front side thereof. Herein the constant value K is determined at a suitable value corresponding to a luminance level of the shadow Ls.

As a result of the process for luminance adjustment, the luminance of the respective faces of the solid body ABCPQR does not change when the polygon a does not exist in the space of the solid body ABCPQR as the shadow space because K−K=0. Accordingly, the shadow Ls is not generated in the space of the solid body ABCPQR as the shadow space.

Further, as a result of the process for luminance adjustment described above, when a part or the whole of the polygon a exists in the space of the solid body ABCPQR as the shadow space, a drawing process by hidden surface removal is not applied to a portion of a face BQRC of the solid body ABCPQR, more backward than the polygon α as seen from the point of view E at the time of drawing, that is, the scope of the shadow Ls, so that luminance is not rendered brighter by the constant value K.

In other words, luminance adjustment by +the constant value K with respect to the portion of the face BQRC, on the backward side of the scope of the shadow Ls, is canceled. Consequently, in step S-7 with respect to the scope of the shadow Ls, there will be executed in consequence only a process of rendering luminance within the scope of a face ABQP of the solid body ABCPQR, lying in a forward position of the polygon α as seen from the point of view E, that is, luminance within the scope of the front face as seen from the point of view E to be the constant value K, thereby creating a state equivalent to that where the shadow Ls of the polygon ABC is projected darkly on the polygon α from the viewpoint of representation.

It follows therefor that the shadow Ls of the polygon ABC can be drawn on the polygon α in the space of the solid body ABCPQR as the shadow space at high speed and with accuracy by simple calculation for luminance adjustment.

The above (step S-8) completes the process for generating the shadow Ls of one of the polygons ABC. In the case where there exist two or more polygons, each casting the shadow Ls, the program for the shadow generation process proceeds to processing of a succeeding polygon, repeating the same process. Upon completion of processing of all polygons, a drawing process for the shadows Ls is completed.

In the case where there exist a plurality (n pieces) of polygons α within the solid body ABCPQR as the shadow space, the shadow Ls is cast wherever the shadow Ls is generated on respective polygons α, so that n times as much as the constant value K is subtracted due to duplicated processing. Such a contradiction can be avoided by means of a limitation process whereby a range of a decrease in luminance is limited to one stage, and if the range of a decrease in luminance exceeds the stage, luminance is subtracted by the constant value K only once.

However, it is necessary to execute luminance adjustment (a process of increasing luminance) in the order of the back side to the front side. This is because if the processing is executed in the order of the front side to the back side when proceeding to a next polygon keeping in a state of the processing at the constant value K, there is executed the limitation process whereby −K−K=−2K is rendered to the constant value K level, and thereafter, is adjusted to + the constant value K level, resulting in ±0, so that the effects of the shadows are canceled. To the contrary, if the processing is executed in the order of the back side to the front side, the constant value K is rendered to + the constant value K (=0), and thereafter, adjustment is made to the constant value K level, so that a state of the constant value K is preserved.

In the case where the point of view E lies within the solid body ABCPQR, the front face thereof in relation to the point of view E does not exists, however, this is dealt with exceptionally as a case of the front face being in a state covering the field of vision.

In the case where the shadow Ls is cast on both polygons α, adjacent to each other, respectively, within the solid body ABCPQR, processing of the shadow Ls of a side shared by both the polygons can be omitted. This is because the shadow spaces of the respective polygons have the same face in common, and if luminance of one of the faces is increased, this will inevitably decrease luminance of the other face, so that such processing is rendered meaningless.

Figure 4:
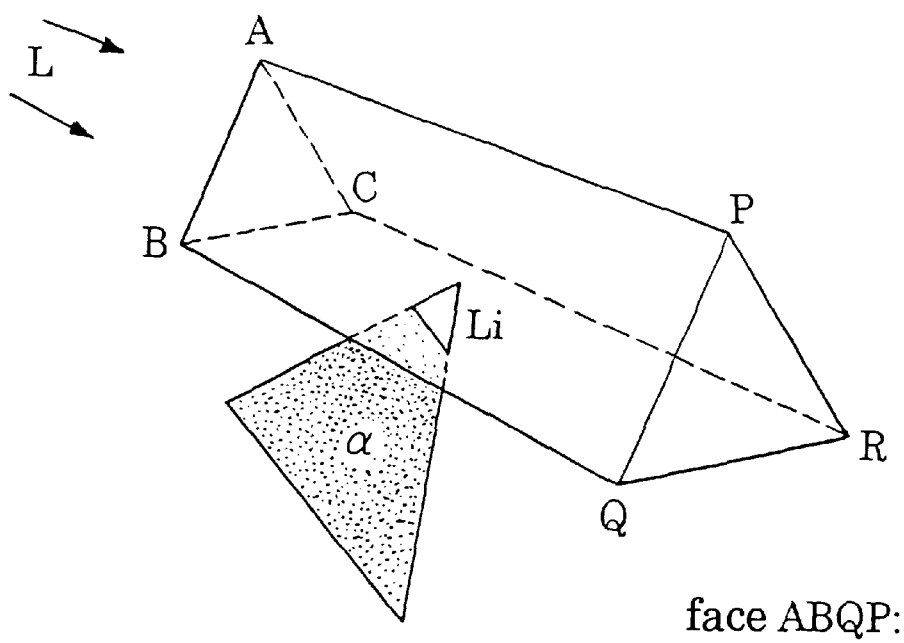
FIG. 4 is a schematic representation of a case of forming an illuminated region by another embodiment of a method of adjusting luminance by light at high speed in rendering 3-D computer graphics, according to the invention.

Now, FIG. 4 shows by way of example a case of forming an illuminated region Li on a portion of a polygon α by ambient light incoming from windows, transparent bodies, and so forth under radiant light rays L from a point light source. As described above, the light rays incoming through windows, transparent bodies, and so forth illuminate the floor, the wall, the ceiling, solid bodies in a complex shape, and so forth, thereby forming the illuminated region Li having luminance higher than that in the surroundings on faces of the solid bodies. The illuminated region Li is in reverse relation to the shadows Ls having luminance lower than that in the surroundings.

Accordingly, assuming that the polygon ABC is a window or a transparent body in the case of drawing the previously-described shadow Ls, the solid body ABCPQR is regarded as an illuminated space for the incoming light rays L. If luminance adjustment is applied to respective faces of the solid body ABCPQR as the illuminated space by designating the respective faces with the positive sign and the negative sign, respectively, contrary to those in the case of drawing the shadow Ls, it is possible to draw the illuminated region Li having luminance higher than that in the surroundings on a polygon α at high speed and with accuracy by the light rays incoming through the windows, transparent bodies, and so forth.

With such a illuminated region generation process as well, when there exist a plurality of polygons α in the solid body ABCPQR as the illuminated space, luminance adjustment is executed in the order of the front side to the back side, and a range of luminance adjustment is limited to one stage. If the range of luminance adjustment exceeds a scope of the stage, an addend value of luminance is limited to the constant value K only.

In the case where the point of view E is within the solid body ABCPQR as the illuminated space, and the front face thereof in relation to the point of view E does not exists, this is dealt with exceptionally as a case of the front face covering the field of vision.

In the case where an illuminated region Li occurs on both polygons α, adjacent to each other, respectively, within the solid body ABCPQR as the illuminated space, processing of the illuminated region Li for a side shared by respective polygons α is omitted.

In this connection, if there are involved a plurality of light sources in the case of executing the shadow generation process and the illuminated region generation process, all the luminance adjustments are executed for each of the light sources, and thereby the results of the luminance adjustments are readjusted depending on brightness and color of the respective light sources.

Further, if a plurality of points of view are involved, a luminance adjustment process is executed for each of the points of view, and final adjustment is made by integrating the results of respective luminance adjustment processes.

For a Z-buffer for use at the time of luminance adjustment, a Z-buffer prepared at the time of common drawing is used as it is. The Z-buffer is referred to at the time of luminance adjustment, but is set not to be renewed.

Further, processing can be performed at high speed by using a frame buffer (F1) prepared at the time of common drawing as it is, if possible, at the time of luminance adjustment, and by renewing the same, however, additional adjustment of luminance can be made by preparing newly a frame buffer (F2) as initialized separately, and using the same at the time of luminance adjustment such that the same as textures is used as it is as a filter in the frame buffer (F1) after completion of a series of processes.

Figure 5:
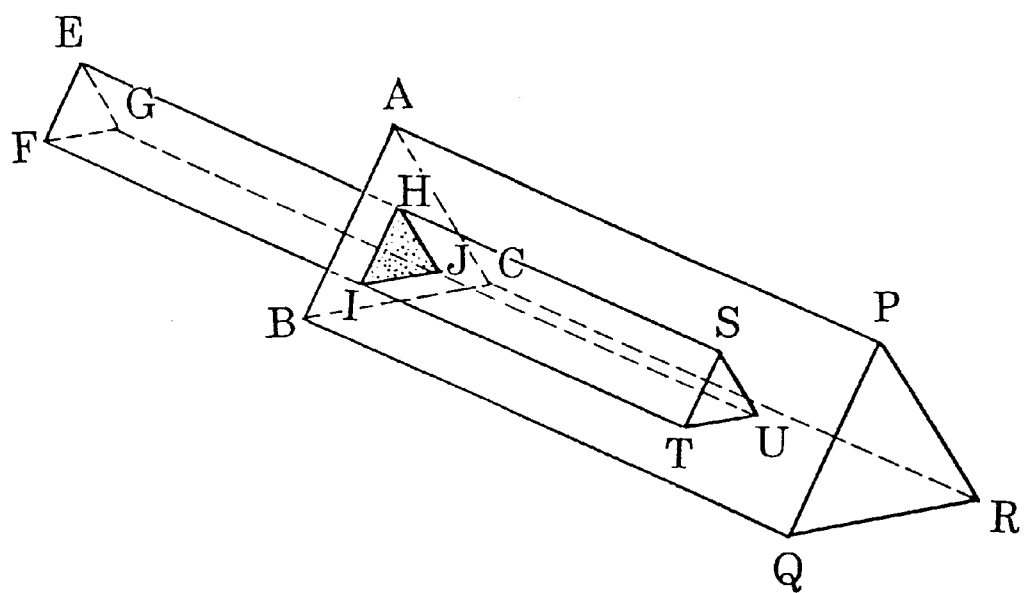
FIG. 5 is a schematic representation showing a state where a polygon ABC which is a shaded face interferes with a solid body EFGSTU as a shadow space of the other polygon EFG.

Now, FIG. 5 shows a state where a polygon ABC which is a shaded face interferes with a solid body EFGSTU as a shadow space of the other polygon EFG. If the shadow generation process for the other polygon EFG is executed in such a state in accordance with the method of the invention, luminance of a triangle HIJ as an interference region within the polygon ABC is decreased by the constant value K based on the Z-buffer method as a result of luminance adjustment of respective faces of the solid body EFGSTU for luminance adjustment with respect to the other polygon EFG, and the luminance remains as changed, deviating from an initially set luminance value.

When the inner product of a direction vector of the light rays L and a normal vector to a face is plus in a stage where drawing of the solid body ABCD is completed as with the case of the polygon ABC which becomes a shaded face, and the other polygon EFG which becomes the other shaded face, such an inconvenient change in luminance can be prevented by prohibiting adjustment of luminance of such faces. Accordingly, the luminance of the polygon ABC which becomes the shaded face, and that of the polygon EFG which becomes the other shaded face do not undergo a change even by the shadow generation process executed after processing of shaded faces of the solid body ABCD, thereby maintaining the initially set luminance value. As a result of prohibition of the adjustment of luminance as described, it becomes unnecessary to execute luminance adjustment with respect to a face of ABC to which a shadow would otherwise occur, so that processing can be speeded up to that extent.

A phenomenon of the inconvenient change in luminance as described above occurs as an increase in luminance by the constant value K of luminance adjustment in the course of the illuminated region Li generation process as well. That is, assuming a case of FIGS. 4 and 5, where the polygon ABC interferes with the solid body EFGSTU as the illuminated space of the other polygon EFG allowing light rays L to pass therethrough although not shown in the figures, a program is able to prevent an increase in luminance of the polygon ABC, caused by processing of the illuminated region Li of the other polygon EFG, by prohibiting change of luminance with respect to the polygon ABC after processing of luminance thereof in a stage where drawing of the solid body ABCD is completed.

Figure 6:
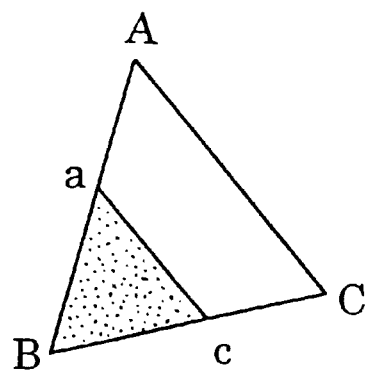
FIG. 6 a schematic representation showing an example of executing smooth shading with respect to the polygon ABC.

With a series of the methods for luminance adjustment, described above, precise drawing can be implemented in flat shading, but the methods can be expanded for application to smooth shading. FIG. 6 shows an example of executing smooth shading with respect to the polygon ABC.

By finding the inner product of a normal vector at respective vertices of the polygon ABC and the direction vector of the light rays L, respectively, and if the inner products at the three vertices are all the same in the sign, and the sign is positive, the same process as for the flat shading is executed while, if the inner products at the three vertices are not all the same in the sign, the polygon ABC is divided into two figures consisting of two triangles, or a triangle and a quadrilateral such that the inner products of a normal vector at interpolated vertices and the direction vector of the light rays L are the same in the sign and thereby the same process as for the flat shading is executed with respect to figures wherein the inner products of a normal vector at faces thereof and the direction vector of the light rays L are positive in the sign. Herein if the figure happens to be a quadrilateral, the quadrilateral is divided into two triangles, with respect to which, the process is executed respectively.

With reference to the sign of the inner products of the normal vector at respective vertices and the direction vector of the light rays L, if it is found at 0, this is included in neither case. For example, if the inner product at two vertices of the polygon ABC, respectively, is positive in the sign, and the same at one vertex thereof is 0, this is treated as a case where the inner products at the three vertices are all the same in the sign. In the case where the smooth shading is applied, a portion inside the polygon ABC, where the inner products of the normal vectors and the direction vectors of the light rays L are positive in the sign, is a crosshatched portion aBc shown in FIG. 6.

With the method according to the invention, a scope of the shadows of an object, formed by light, or illuminated regions formed by ambient light incoming from windows, and the like can be drawn at a high-speed and with accuracy in rendering 3-D computer graphics, so that a waiting time of an operator when using a 3-D graphics tool can be shortened, and realistic representation can be implemented when executing interactive display by accurately drawing the scope of the shadows of the object, formed by light, or the illuminated regions formed by ambient light incoming from windows, and the like, which has been impossible to implement in the past.

In the case where there exist a plurality of polygons in a solid body as a shadow space or an illuminated space, luminance adjustment is executed by specifying the order in which such adjustment is done, that is, from the back side to the front side as seen from a point of view, and a range of luminance adjustment is limited to one stage, so that, if a range of luminance adjustment as required exceeds the stage, a luminance adjustment value is limited to a constant value only. As a result, luminance in the scope of shadows is not decreased more than necessary nor is luminance in the illuminated regions increased more than necessary.

In the case where the point of view lies within the solid body as the shadow space or the illuminated space, and consequently, a front face thereof in relation to the point of view does not exists, by dealing with this situation exceptionally as a case of the front face covering the field of vision, it becomes possible to execute the same shadow generation process or the same illuminated region generation process as described before even in such special conditions as described above.

In the case where a shadow or a illuminated region occurs to both polygons, adjacent to each other, lying within the solid body as the shadow space or the illuminated space, processing of the shadow of a side shared by the polygons adjacent to each other can be omitted, thereby enabling an operation time to be shortened.

Furthermore, in case that a polygon interferes with a solid body as a shadow space or an illuminated space of the other polygon, a decrease or an increase in luminance of the polygon, caused by the shadow generation process or the illuminated region generation process with respect to the other polygon, can be prevented by prohibiting change of luminance with respect to the polygon after the process for luminance adjustment is executed in a stage where drawing of a solid body is completed, thereby enabling a drawing state of the solid body to be preserved at an initial luminance value.

What is claimed is:

1. A method of adjusting luminance by light at high speed in rendering 3-D computer graphics, wherein in a process of generating a shadow in 3-D computer graphics, a solid body is drawn in a drawing space as a target for drawing, and subsequently, the process of generating the shadow is executed with respect to a polygon facing away from light rays among all polygons composing the solid body existing in the drawing space, said process comprising the steps of:

forming a solid body as a shadow space of the polygon by causing respective vertices of the polygon to be shifted in the vector direction of the light rays to the boundary of the drawing space; and increasing luminance within a scope of faces on the back side of the solid body, as seen from the point of view at the time of drawing with respect to respective faces composing the solid body, by adding a constant value for luminance adjustment to the luminance within the scope of the faces on the back side of the solid body, while-decreasing luminance within a scope of faces on the front side of the solid body, as seen from the point of view at the time of drawing, by subtracting to the extent of the constant value for luminance adjustment from the luminance within the scope of the faces on the front side of the solid body, wherein, when a polygon does not exist in the shadow space of the solid body, luminance of respective faces of the solid body is rendered to be in a state undergoing no change and, when the polygon exists in the shadow space of the solid body, a drawing process by hidden surface removal is not applied to the respective faces of the solid body, more backward than the polygon, as seen from the point of view at the time of drawing, and luminance in a region of hidden surface removal is not rendered brighter by the constant value, thereby executing a process of rendering luminance within the scope of a face of the solid body, lying in a forward position of the polygon as seen from the front face thereof, subtracted consequentially by the constant value, and creating a state equivalent to that where the shadow of the polygon is projected on the polygon from the viewpoint of representation, so that drawing of the shadow of the polygon is implemented on the polygon at high speed and with accuracy.

2. A method of adjusting luminance by light at high speed in rendering 3-D computer graphics according to claim 1, wherein, if a plurality of polygons exist in the solid body as the shadow space, luminance adjustment is executed in the order of the back side to the front side as seen from the point of view and a range of luminance adjustment is limited to one stage, so that if the luminance adjustment exceeds the range, a subtrahend value of luminance is limited to the constant value only.

3. A method of adjusting luminance by light at high speed in rendering 3-D computer graphics according to claim 1, wherein in the case where the point of view lies within the solid body as the shadow space, and the front face thereof in relation to the point of view does not exist, processing is executed on the basis that the front face is in a state covering the field of vision.

4. A method of adjusting luminance by light at high speed in rendering 3-D computer graphics according to claim 1, wherein in the case where the shadow is cast on both polygons, adjacent to each other, respectively, within the solid body as the shadow space, processing of the shadow of a side shared by both the polygons is omitted.

5. A method of adjusting luminance by light at high speed in rendering 3-D computer graphics according to claim 1, further comprising, when a first polygon which is a shaded face interferes with a solid body as a shadow space of a second polygon, preventing a decrease in luminance of the first polygon, caused by the shadow generation process applied to the second polygon, by prohibiting a change of luminance with respect to the first polygon after processing of the shaded face in a stage where drawing of a solid body is completed.

6. A method of adjusting luminance by light at high speed in rendering 3-D computer graphics, wherein in a process of generating an illuminated region by light rays in 3-D computer graphics, a solid body is drawn in a drawing space as a target for drawing according to the Z-buffer method or a method similar thereto, and subsequently, the process of generating the illuminated region is executed with respect to a polygon allowing the light rays to pass therethrough among all polygons composing the solid body existing in the drawing space, said process comprising the steps of:

forming a solid body as an illuminated space, formed by the polygon, by shifting respective vertices of the polygon in the vector direction of the light rays to the boundary of the drawing space; and decreasing luminance within a scope of faces on the back side of the solid body as seen from the point of view at the time of drawing with respect to respective faces composing the solid body by subtraction to the extent of a constant value for luminance adjustment, increasing luminance within a scope of faces on the front side of the solid body as seen from the point of view at the time of drawing by addition to the extent of the constant value for luminance adjustment, wherein, when a polygon does not exist in the illuminated space of the solid body, luminance of respective faces of the solid body is rendered to be in a state undergoing no change, and when the polygon exists in the illuminated space of the solid body, a drawing process by hidden surface removal is not applied to the respective faces of the solid body, more backward than the polygon as seen from the point of view at the time of drawing, and luminance in a region of hidden surface removal is not rendered darker by the constant value, thereby executing a process of rendering luminance within the scope of a face of the solid body, lying in a forward position of the polygon as seen from the front face thereof, added consequentially by the constant value, and creating a state equivalent to that where the illuminated region formed by the polygon is projected on the polygon from the viewpoint of representation, so that drawing of the illuminated region of the light rays from the polygon is implementedon the polygonat high speed and with accuracy.

7. A method of adjusting luminance by light at high speed in rendering 3-D computer graphics according to claim 6, wherein, if a plurality of polygons exist in the solid body as the illuminated space, luminance adjustment is executed in the order of the front side to the back side as seen from the point of view and a range of luminance adjustment is limited to one stage, and if the range of the luminance adjustment exceeds the stage, an addend value of luminance is limited to the constant value only.

8. A method of adjusting luminance by light at high speed in rendering 3-D computer graphics according to claim 6, wherein in the case where the point of view lies within the solid body as the illuminated space, and the front face thereof in relation to the point of view does not exist, processing is executed on the basis that the front face is in a state covering the field of vision.

9. A method of adjusting luminance by light at high speed in rendering 3-D computer graphics according to claim 6, wherein in the case where the illuminated region occurs to both polygons, adjacent to each other, respectively, within the solid body as the illuminated space, processing of the illuminated region of a side shared by both the polygons is omitted.

10. A method of adjusting luminance by light at high speed in rendering 3-D computer graphics according to claim 6, wherein, when a first polygon interferes with a solid body as an illuminated space of a second polygon allowing light rays to pass therethrough, preventing an increase in luminance of the first polygon, caused by processing of the illuminated region of the second polygon, by prohibiting a change of luminance with respect to the first polygon after processing of luminance thereof in a stage where drawing of a solid body is completed.

* * * * *